(12) United States Patent
Kim et al.

(10) Patent No.: US 12,521,147 B2
(45) Date of Patent: Jan. 13, 2026

(54) UTERINE MANIPULATOR

(71) Applicant: EZMEDIBOT CO., LTD., Seongnam-si (KR)

(72) Inventors: Byung Kyu Kim, Seoul (KR); Soo Young Kim, Goyang-si (KR)

(73) Assignee: EZMEDIBOT CO., LTD., Seongnam-si (KR)

( * ) Notice: Subject to any disclaimer, the term of this patent is extended or adjusted under 35 U.S.C. 154(b) by 184 days.

(21) Appl. No.: 18/469,415

(22) Filed: Sep. 18, 2023

(65) Prior Publication Data

US 2024/0000483 A1 Jan. 4, 2024

Related U.S. Application Data

(63) Continuation of application No. PCT/KR2022/002662, filed on Feb. 23, 2022.

(30) Foreign Application Priority Data

Mar. 31, 2021 (KR) .......................... 10-2021-0042332

(51) Int. Cl.
*A61B 17/42* (2006.01)

(52) U.S. Cl.
CPC ................. *A61B 17/4241* (2013.01)

(58) Field of Classification Search
CPC ..... A61B 17/4241; A61B 34/30; A61B 34/74; A61B 2034/305; A61B 2017/00477; A61B 2017/4216
See application file for complete search history.

(56) References Cited

U.S. PATENT DOCUMENTS

| 5,382,252 A | 1/1995 | Failla et al. |
| 5,445,643 A | 8/1995 | Valtchev |
| 5,556,401 A | 9/1996 | Caillouette |

(Continued)

FOREIGN PATENT DOCUMENTS

| JP | 2011-004880 A | 1/2011 | |
| JP | 2019-122785 A | 7/2019 | |
| WO | WO-2020206297 A1 * | 10/2020 | ......... A61B 17/4241 |

OTHER PUBLICATIONS

Yang et al., Robotic natural orifice transluminal endoscopic surgery (NOTES) hysterectomy as a scarless and gasless surgery. Surgical Endoscopy (2020) 34: 492-500 (epub Nov. 14, 2019) (Year: 2019).*

(Continued)

*Primary Examiner* — Tan-Uyen T Ho
*Assistant Examiner* — Cherie M Poland
(74) *Attorney, Agent, or Firm* — Studebaker Brackett PLLC

(57) ABSTRACT

Disclosed is a uterine manipulator that may automatically adjust a location and a posture of a uterus according to an input of a user. The uterine manipulator according to the inventive concept may allow a motion of a total of four degrees of freedom with a rotation of a 3 degree of freedom of rolling, pitching, and yawing, and a linear movement of one degree of freedom in a forward/rearward direction, and because the tip may be adjusted in a narrow space, surgical preciseness may be enhanced. Furthermore, because the surgical operator may manipulate the uterus through a direct input, a surgical time may be shortened.

14 Claims, 13 Drawing Sheets

(56) References Cited

U.S. PATENT DOCUMENTS

| | | |
|---|---|---|
| 5,645,561 A | 7/1997 | Smith et al. |
| 8,292,901 B2 | 10/2012 | Auerbach et al. |
| D749,215 S | 2/2016 | Ahluwalia et al. |
| D750,779 S | 3/2016 | Ahluwalia et al. |
| D751,198 S | 3/2016 | Ahluwalia et al. |
| D755,966 S | 5/2016 | Ahluwalia et al. |
| D755,967 S | 5/2016 | Ahluwalia et al. |
| D755,968 S | 5/2016 | Ahluwalia et al. |
| 9,327,097 B2 | 5/2016 | Ahluwalia |
| D763,445 S | 8/2016 | Ahluwalia et al. |
| D763,446 S | 8/2016 | Ahluwalia et al. |
| 9,522,252 B2 | 12/2016 | Ahluwalia et al. |
| 9,554,827 B2 | 1/2017 | Omori |
| 10,639,072 B2 | 5/2020 | Ahluwalia |
| 2008/0200836 A1 | 8/2008 | Speeg et al. |
| 2010/0305578 A1 | 12/2010 | Auerbach et al. |
| 2010/0331859 A1 | 12/2010 | Omori |
| 2014/0005705 A1* | 1/2014 | Weir ................ A61B 18/08 606/169 |
| 2014/0276916 A1 | 9/2014 | Ahluwalia et al. |
| 2015/0148812 A1* | 5/2015 | Ahluwalia ........ A61B 17/4241 606/119 |
| 2017/0112535 A1 | 4/2017 | Ahluwalia |
| 2018/0325552 A1* | 11/2018 | Weihe ............... A61B 18/1482 |
| 2019/0223967 A1* | 7/2019 | Abbott ............... A61B 17/29 |
| 2020/0078109 A1 | 3/2020 | Steger et al. |
| 2020/0297385 A1 | 9/2020 | Ahluwalia |
| 2023/0073575 A1* | 3/2023 | Scheib .............. A61B 34/25 |

OTHER PUBLICATIONS

International Search Report issued in PCT/KR2022/002662; mailed Jun. 10, 2022.

The extended European search report issued by the European Patent Office on Jul. 24, 2024, which corresponds to European Application No. 22781401.9-1113 and is related to U.S. Appl. No. 18/469,415.

* cited by examiner

UTERINE MANIPULATOR

CROSS-REFERENCE TO RELATED APPLICATIONS

The present application is a continuation of International Patent Application No. PCT/KR2022/002662, filed on Feb. 23, 2022, which is based upon and claims the benefit of priority to Korean Patent Application No. 10-2021-0042332 filed on Mar. 31, 2021. The disclosures of the above-listed applications are hereby incorporated by reference herein in their entirety.

BACKGROUND

Embodiments of the inventive concept described herein relate to a uterine manipulator, and more particularly, relate to a uterine manipulator that may be automatically operated according to an input of a user.

For a successful minimally invasive laparoscopic surgery, a device that may assist the limitations of physical manipulation of an endoscopic camera that is inserted into a laparoscope is required. In particular, in the case of a laparoscopic gynaecological surgery, a posture and a location of a uterus are adjusted as necessary during a surgery because a field of view is obscured by the uterus or interferences with surgical tools occur. However, conventional auxiliary devices inserted into a vagina require an additional surgical assistant, and a posture and a location of the uterus are adjusted by directly applying a force to the device by hands mostly through communication with a main operator. The conventional schemes delay surgery time and deteriorates accuracy. To solve this problem, an automated in-uterus manipulation robot has been developed, but because movement of the robot is not ergonomic, it may cause damage to the patient's organs when used, and because the manipulation scheme is not intuitive, it takes a lot of time for an operator to become proficient in operation.

With regard to the conventional uterine manipulator, U.S. Pat. No. 5,645,561 is disclosed.

SUMMARY

Embodiments of the inventive concept provide a uterine manipulator that may secure stability and may be intuitively manipulated to solve a problem of a conventional manipulator.

According to an embodiment, a uterine manipulator includes a housing disposed on an outside of a human body during use thereof, an extension part provided on a front side of the housing, extending in a forward/rearward direction, and at least a portion of which is configured to be inserted into a virginal canal, and a tip that is inserted into a uterus, and connected to a front end of the extension part to pitch and yaw, the tip is configured to receive power from the housing such that an angle thereof is adjusted.

Meanwhile, the uterine manipulator may further include a sub frame that supports the housing such that the housing is rotatable about a central axis in the forward/rearward direction, and a rolling driving part provided in the sub frame, connected to one side of the housing, and that rotates the housing about the central axis in the forward/rearward direction.

Meanwhile, the uterine manipulator may further include a yawing driving part provided on an inside of the housing, and that transmits driving power to yaw the tip, a pitching driving part provided on the inside of the housing, and that pitches the tip, a first power transmission part, at least a portion of which disposed on an inside of the extension part such that the first power transmission part receives power from the yawing driving part to yaw the tip, and a second power transmission part, at least a portion of which is disposed on the inside of the extension part such that the second power transmission part receives power from the pitching driving part to pitch the tip.

Meanwhile, the uterine manipulator may include a joint assembly connecting the first power transmission part and the second power transmission part, and the tip, and the joint assembly may be configured such that a rotational central axis of yawing of the tip and a rotational central axis of pitching of the tip cross each other.

Meanwhile, the joint assembly may be configured to yaw the tip according to a remote center motion mechanism.

Meanwhile, the uterine manipulator may further include the joint assembly includes a joint connecting part provided on an opposite side of the extension part, and having an arc slot, a center of which is one point formed on an inner side toward a front side thereof, a first joint including a first follower inserted into the arc slot, and having a pair of holes on left and right sides thereof, and a second joint including a pair of connection pins extending in opposite directions to pass through the pair of holes of the first joint, and that is rotatable relative to the first joint.

Meanwhile, the first power transmission part may include a second follower and a third follower, sides of which are connected to the yawing driving part and opposite sides of which are connected to the pair of connection pins.

Meanwhile, one side of the second power transmission part may be connected to the pitching driving part, and an opposite thereof is connected one of the second joint.

Meanwhile, the first joint may be operated by the remote center motion mechanism according to locations of the first follower, the second follower, and the third follower.

Meanwhile, the first power transmission part may include a bevel gear that receives the power from the yawing driving part, and a pair of pitching driving links, sides of which are connected to two points radially spaced apart from a rotational central axis of the bevel gear by a specific distance to be rotatable, and including the first follower and the second follower at opposite ends thereof.

Meanwhile, the second power transmission part may include a bevel gear that receives the power from the pitching driving part, and a pitching driving link that receives the power from the bevel gear on one side thereof, that is moved in the forward/rearward direction according to rotation of the bevel gear, and an opposite side of which is connected to one side of the second joint.

Meanwhile, the pitching driving link may include a rotary joint that allows one side of the pitching driving link and an opposite side of the pitching driving link to be rotated with respect to each other.

Meanwhile, the uterine manipulator may further include a main frame, and the sub frame may be configured to be linearly moved on the main frame in the forward/rearward direction.

Meanwhile, the uterine manipulator may further include a linear driving part provided on one side of the main frame, one side of which is connected to one side of the housing, and that moves the housing and the sub frame in the forward/rearward direction.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
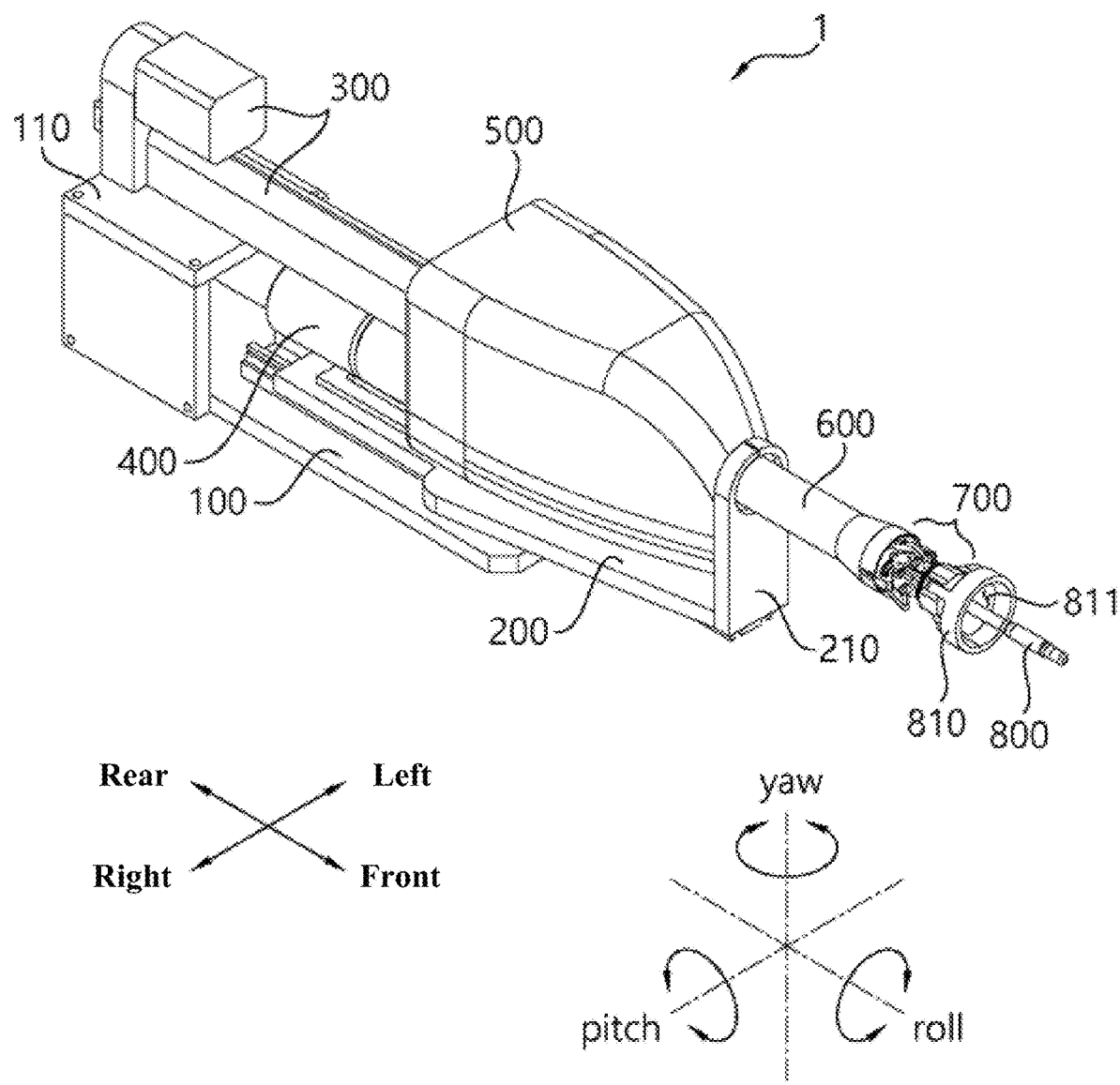
FIG. 1 is a perspective view of a uterine manipulator according to the inventive concept.

Here, uterine manipulators according to embodiments of the inventive concept will be described in detail with reference to the accompanying drawings. Furthermore, in the following description of the embodiments may be referred to as other names in the field. However, as long as the components have functional similarities and identities, they may be regarded as equivalent components even though modified embodiments are employed. Furthermore, reference numerals that denote the components are provided for convenience of description. However, the contents illustrated on the drawings, to which the reference numerals are provided, do not limit the components to the range in the drawings. Similarly, even though an embodiment, in which the configurations on the drawings are partially modified, is employed, it may be regarded as an equivalent configuration as long as there are functional similarities and identities. Furthermore, when a component is admitted as one that has to be essentially included in view of a level of a general technician of the technical field, a description thereof will be omitted.

Hereinafter, a portion of a uterine manipulator according to the inventive concept may be disposed on an outside of a uterus during use thereof, and a tip at an end thereof may be inserted into the uterus such that the uterine manipulator receives power from an outside to change a posture and a location of the uterus. Then, an operation of the uterine manipulator may be controlled by generating an electrical signal through a manipulation by a surgical operator or an input by a surgery assistant, for example, through an input of a control stick or a button such that the uterine manipulator is electrically controlled based on it.

Meanwhile, widely used configurations may be applied for a configuration for inputs and a configuration for constituting a control part, a description thereof will be omitted, and a uterine manipulator that is operated by inputs will be described in detail.

Furthermore, in the inventive concept, a direction that faces a tip from a housing, that is, a direction, in which the tip is moved to be inserted into a uterus, will be defined as a 'forward direction', an opposite direction thereto will be defined as a 'rearward direction', and opposite directions with respect to the forward direction will be defined as a 'leftward/rightward direction'.

Hereinafter, a configuration of the uterine manipulator according to the inventive concept will be described in detail with reference to FIGS. 1 to 3.

Figure 2:
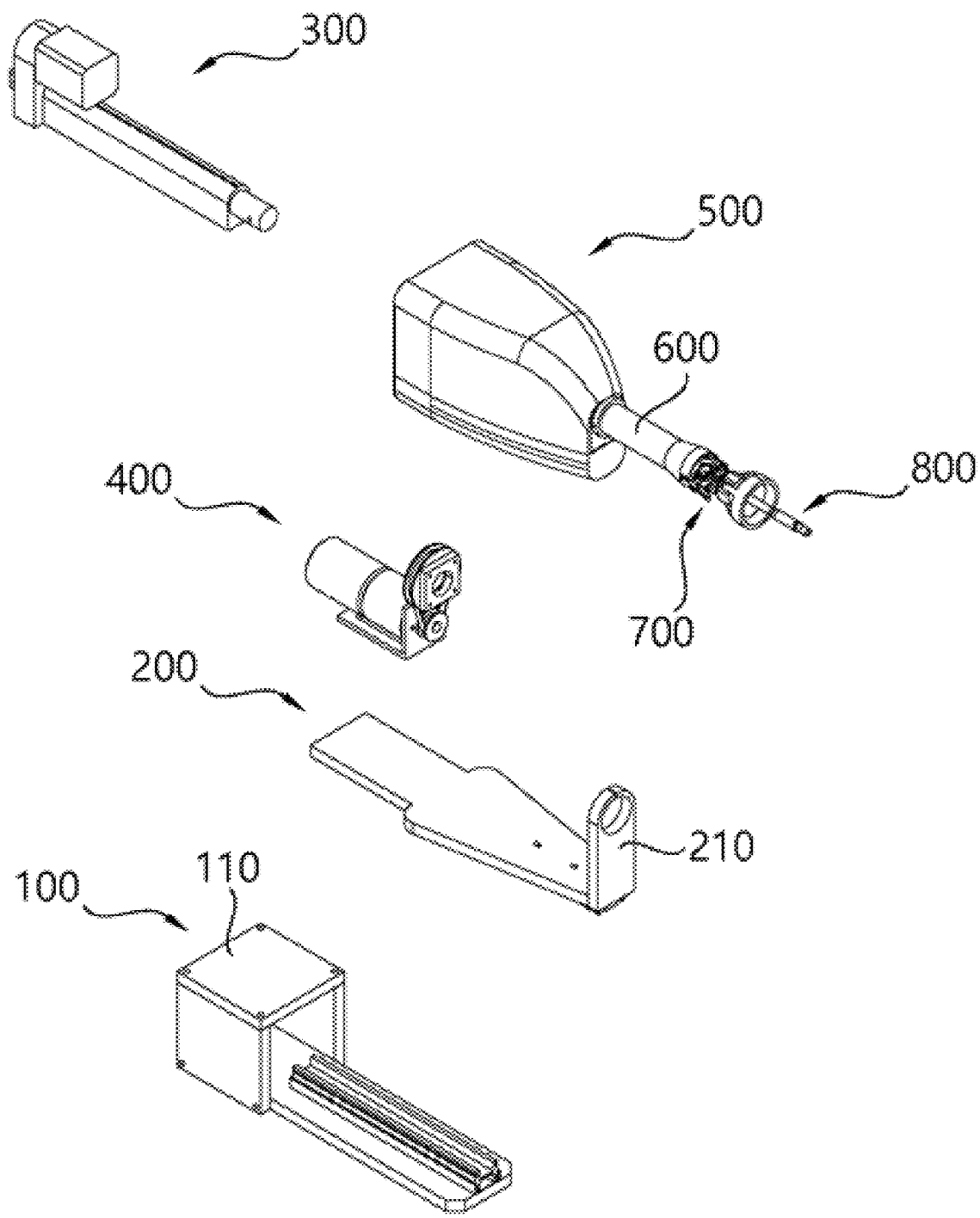
FIG. 2 is an exploded perspective view of a uterine manipulator according to the inventive concept.

FIG. 1 is a perspective view of a uterine manipulator 1 according to the inventive concept, and FIG. 2 is an exploded perspective view of the uterine manipulator 1 according to the inventive concept.

Referring to FIGS. 1 and 2, the uterine manipulator 1 according to the inventive concept may configured to face a front side, a portion of a front side thereof may be configured to be inserted into an interior of a human body, as an example, a virginal canal and a uterus, and a portion of a rear side thereof may have a configuration that is not inserted into the human body.

The uterine manipulator 1 according to the inventive concept may be configured to allow a 4-axis motion. To achieve this, the uterine manipulator 1 according to the inventive concept may include a main frame 100, a sub frame 200, a linear driving part 300, a rolling driving part 400, a housing 500, an extension part 600, and a tip 800, external appearances of which are distinguished.

The main frame 100 is a base, in which the uterine manipulator 1 according to the inventive concept may be disposed. The sub frame 200 that will be described below may be disposed on an upper surface of the main frame 100, and a lower side of the main frame 100 may be disposed and seated on an external table or the like. A linear driving part support part 110 that is formed such that one side thereof is stepped in an upward/downward direction may be provided on one side of the main frame 100 such that the linear driving part 300 is provided. An example having a box shape is illustrated as the linear driving part support part 110, but this is a simple example and various shapes are possible.

The sub frame 200 may be configured such that the housing 500 and the rolling driving part 400, which will be described below, are disposed therein. The sub frame 200 may be connected to the main frame 100 through a linear guide such that a lower side thereof is moved in a forward/rearward direction while being supported by the main frame 100.

The sub frame 200 may include housing fixing parts 210 that are formed to extend in an upward direction from two points that are spaced part from each other in the forward/rearward direction. The housing fixing parts 210 may be connected to the housing 500 to be rotatable on front and rear sides of the housing 500. Meanwhile, a space, in which the rolling driving part 400 that will be described below may be disposed, is provided on one side of the sub frame 200.

The linear driving part 300 may provide power such that the sub frame 200 is linearly moved on the main frame 100. One side of the linear driving part 300 may be fixed to the above-described linear driving part support part 110 of the main frame 100, and an opposite side thereof may be provided on a rear side of the housing 500. The opposite side of the linear driving part 300 may be connected to the housing 500 to be rotatable about an axis thereof in the forward/rearward direction to minimize an influence of the housing 500 during rolling of the housing 500, which will be described below.

The rolling driving part 400 may be configured to rotate the housing 500, the extension part 600 that is connected to the housing 500, and the tip 800. The rolling driving part 400, as an example, may be provided on a rear side of the sub frame 200, and may be connected to a rear side of the housing 500 by a belt pulley to rotate the housing 500. Meanwhile, it is preferable to limit an actual location and an actual posture of the uterus to a specific range such that a damage to a human body is prevented when the uterus is switched to rolling. As an example, a radius of gyration of the rolling driving part 400 with respect to a vertically upward direction may be limited.

The housing 500 is provided with a space, in which driving elements for driving the tip 800 are provided. The extension part 600 may be formed on a front side of the housing 500, and the tip 800 may be provided on a front side of the extension part 600.

Meanwhile, in the uterine manipulator 1 according to the inventive concept, the housing 500 is disposed on an outside of the human body when being used, and is not inserted into an interior of the human body when being used. When the uterine manipulator 1 according to the inventive concept is used, the tip 800 is inserted into the uterus through a virginal canal first, and a front portion of the extension part 600 is inserted into an interior of the virginal canal until the tip 800 is completely inserted into the uterus. Accordingly, a diameter of the extension part 600 may be limited to a specific size such that the extension part 600 has an outer diameter that does not damage a virginal canal of a female person when the extension part 600 is inserted into the virginal canal. Meanwhile, the extension part 600 may have a length that is rather larger than a length of a virginal canal of a female person to prevent other components than the extension part 600 and the tip 800 from contacting the human body during an operation of the uterine manipulator 1. The extension part 600 may have a through-hole that extends in a lengthwise direction thereof, and at least some of power transmission elements may be disposed in the through-hole such that an angle of the tip 800 inserted into the human body is adjusted by using power generated in the housing 500 disposed on an outside of the human body.

The tip 800 provided at a front end of the uterine manipulator 1 may be configured to be inserted into the interior of the uterus, and a colpotomizing cup 810 may be provided at a point that is spaced apart from an end of the tip 800 to a rear side by a specific distance. The colpotomizing cup 810 may have a shape of a cup that has an inner peripheral surface that is spaced apart from an outer peripheral surface of the tip 800 by a specific distance. The colpotomizing cup 810 may be configured to surround a uterine cervix at a location, at which the uterine manipulator 1 is completely inserted. The colpotomizing cup 810 may be connected to a second joint 730 that will be described below such that a direction thereof is adjusted together with the tip 800. A plurality of windows 811 each having an opening may be provided on a side surface of the colpotomizing cup 810 such that it may be identified whether the colpotomizing cup 810 is disposed at a proper location from an outside through a virginal canal.

The tip 800 may be provided at a front end of the extension part 600, and may be configured to allow yawing and pitching. In detail, an angle of a joint assembly 700 that is configured to connect the tip 800 and the extension part 600 may be adjusted and may finally become an angle of the tip 800. The angle of the joint assembly 700 may be adjusted by a first power transmission part 520 and a second power transmission part 540. As a result, the joint assembly 700 may be configured to allow a 2-axis rotation complexly. The joint assembly 700 is configured such that a rotational central axis for yawing of the tip and a rotational central axis for pitching of the tip cross each other. As an example, the joint assembly may be configured to yaw due at a front end of the extension part 600 due to a remote center motion mechanism.

Hereinafter, a power transmission structure will be described in detail with reference to FIG. 3.

Figure 3:
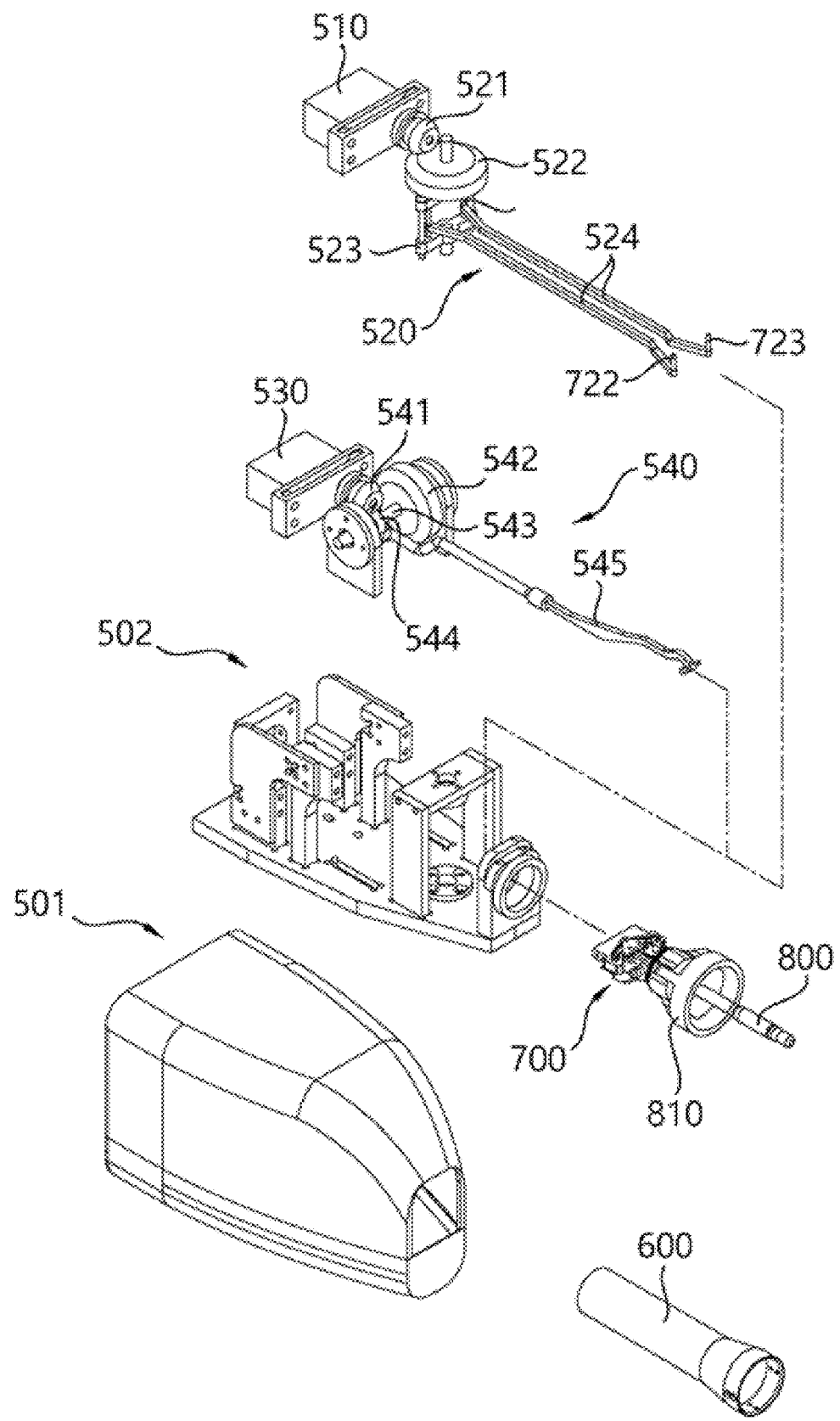
FIG. 3 is a partially exploded view illustrating a configuration for manipulating a housing and a tip.

FIG. 3 is a partially exploded view illustrating a configuration for manipulating the housing 500 and the tip 800.

Referring to FIG. 3, the housing 500 and the extension part 600 may be provided with power generating elements and power transmission elements in interior spaces thereof.

The housing 500 may have a space in an interior thereof, and may include an upper housing 501 and a lower housing 502. A yawing driving part 510, a pitching driving part 530, a portion of the first power transmission part 520, and a portion of the second power transmission part 540 may be provided in an interior of the housing 500. Furthermore, the tip 800 and the extension part 600 may be connected to each other by the joint assembly 700. The joint assembly 700 may include a joint connecting part 710, a first joint 720, and the second joint 730. That is, structures for generating power in the interior of the housing 500 to drive the tip 800 at a remote distance may be disposed in the housing 500 and the extension part 600.

The yawing driving part 510 is connected to the first power transmission part 520 to transmit power, and is operate to yaw the tip 800. The pitching driving part 530 is connected to the second power transmission part 540 to transmit power, and is operated to pitch the tip 800. Meanwhile, this will be described later in detail.

Figure 4:
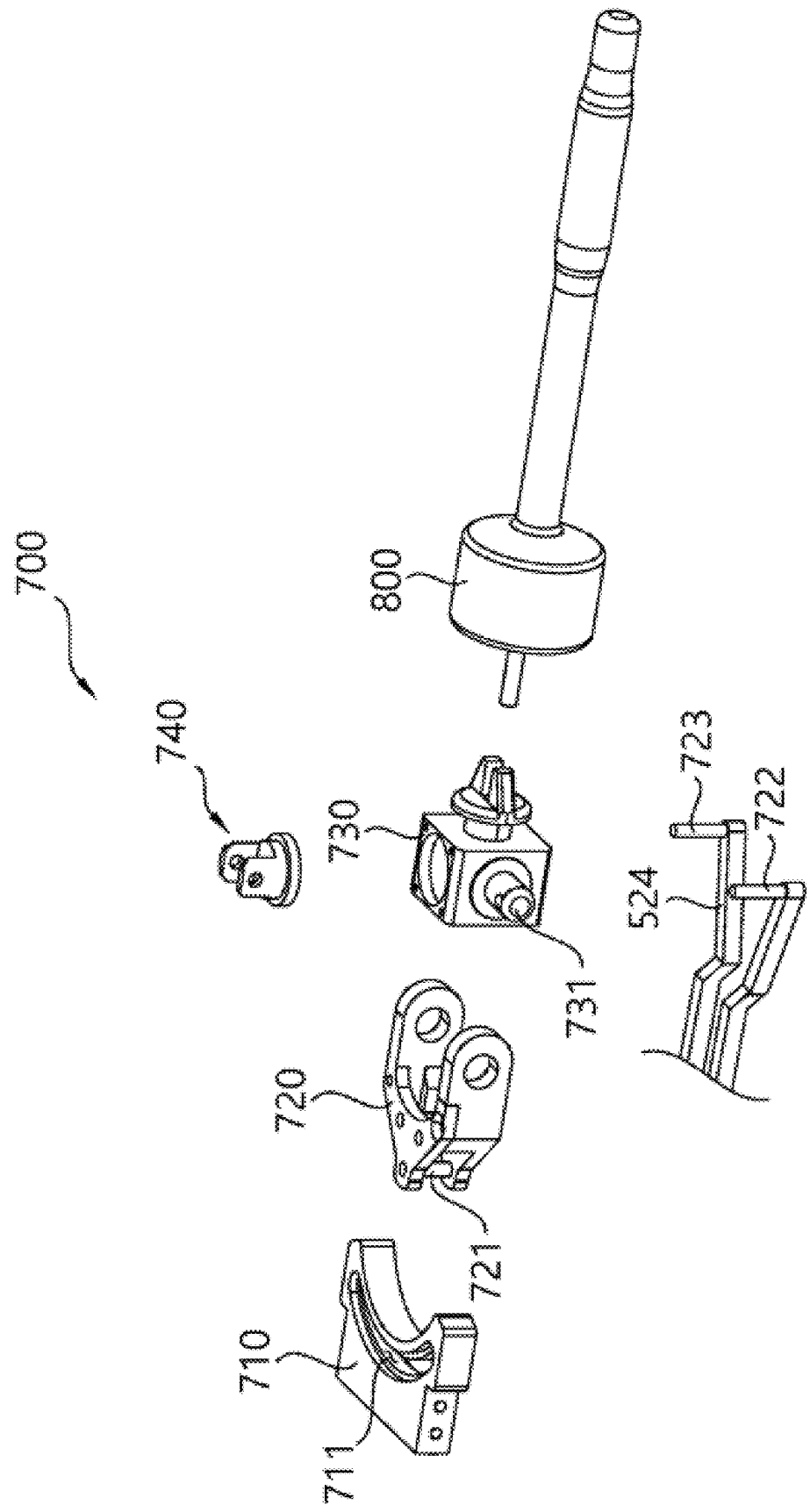
FIG. 4 is an exploded perspective view of a joint assembly.

FIG. 4 is an exploded perspective view of the joint assembly.

Referring to FIG. 4, the joint assembly 700 may be configured to allow yawing and pitching. The joint assembly 700 may include the joint connecting part 710, the first joint 720, the second joint 730, and a sub joint 740.

The joint connecting part 710 may be provided such that one side thereof is fixed to a front end of the extension part 600, and may be operated together with the first joint 720 to generate a remote center motion mechanism, a rotation center of which is formed on a front side. The joint connecting part 710 may include an arc slot 711 having a specific length, a center of which is a point that is spaced apart from the joint connecting part 710 to a front side by a specific distance.

A first follower 721 is provided on a rear side of the first joint 720. The first follower 721 is configured in a form of a pin of a specific length to be freely moved along an arc path in the above-described arc slot 711. The first joint 720 is provided with a space, in which the second joint may be disposed, at a central portion of the first joint 720. Left and right sides of the first joint 720 are formed to extend in the forward/rearward direction by a specific length, and holes that extend in leftward/rightward directions, respectively, are formed in the left and right sides thereof, respectively. Meanwhile, pins provided at ends of the yawing driving links in an upward/downward direction function as a second follower 722 and a third follower 723 such that the first joint 720 performs a circle center motion along the arc slot 711.

The second joint 730 may be connected to the first joint 720 to pitch thereon. That is, the second joint 730 may be connected to the first joint 720 to be rotatable by using connection pins 731 provided on left and right sides of the second joint 730 in a state, in which the first joint 720 and the second joint 730 are arranged. Meanwhile, the second follower 722 and the third follower 723, which have been described above, are connected to the pair of connection pins 731 in the upward/downward direction, respectively, and are connected to the connection pins to be rotatable relative to each other while the upward/downward direction is taken as a central axis.

Consequently, when the pair of yawing driving links are linearly moved in opposite directions, angles of the first joint and the second joint in a yawing direction together may be adjusted with respect to a rotation center of the arc slot 711 by the remote center motion mechanism. Then, a yawing angle of the tip connected to the front side of the second joint also is adjusted with respect to the same center as that of the second joint.

The sub joint 740 may be connected to the second joint 730 to be rotatable about a vertical axis, and may be connected thereto to be rotatable about substantially the same rotational central axis as the central axis of the above-described arc slot 711.

Figure 5:
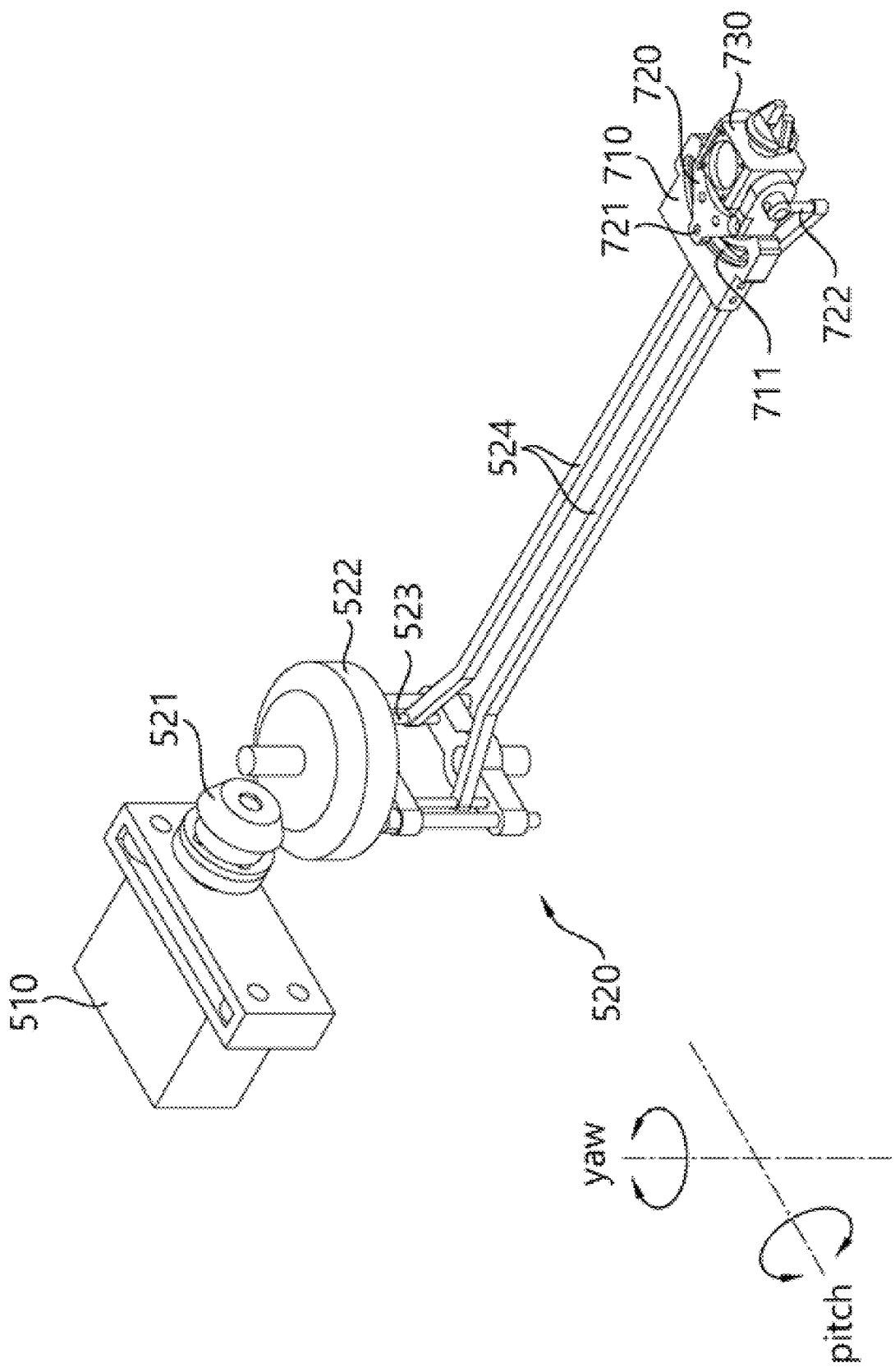
FIG. 5 is an exploded perspective view of a first power transmission part.

FIG. 5 is an exploded perspective view of the first power transmission part 520. Meanwhile, as described above, in the first power transmission part 520, the joint connecting part 710 may be configured such that one side thereof is fixed to a front end of the extension part 600, and may be operated together with the first joint 720 to generate a remote center motion mechanism, a rotation center of which is formed on a front side thereof. The joint connecting part 710 may include the arc slot 711 of a specific length, a center of which is a point that is spaced apart from the joint connecting part 710 to a front side by a specific distance.

Referring to FIG. 5, the first power transmission part 520 may include a first yawing bevel gear 521, a second yawing bevel gear 522, a yawing driving link connecting part 523, and a yawing driving link 524.

The first yawing bevel gear 521 is connected to the yawing driving part 510 to be rotated, and the second yawing bevel gear 522 is engaged with the first yawing bevel gear 521 to be rotated. In the embodiment, a size of the second yawing bevel gear 522 may be larger than that of the first yawing bevel gear 521 for precise adjustment, but a gear ratio of the first yawing bevel gear 521 and the second yawing bevel gear 522 may be selected to be a suitable value according to an rpm and a torque of a motor.

The yawing driving link connecting part 523 may be connected to one side of the second yawing bevel gear 522 to be rotated together with the second yawing bevel gear 522. The yawing driving links 524 that will be descried below may be connected to the yawing driving link connecting part 523 at two points that are spaced apart from each other with respect to a rotation center axis of the second yawing bevel gear 522.

Meanwhile, an adjusted angle of the tip 800 of the uterine manipulator 1 may be in an operation range of about 45 degrees to the left and right sides to prevent damage to the human body. Accordingly, the pair of yawing driving links 524 are connected to each other to be operated not to interfere with each other even though the yawing driving link connecting part 523 is rotated.

Sides of the pair of yawing driving links 524 are connected to the yawing driving link connecting part 523. The pair of yawing driving links 524 are provided to be symmetrical to each other with respect to a rotation center of the second yawing bevel gear 522, and thus, when the yawing driving link connecting part 523 is rotated, any one of the pair of yawing driving links 524 is moved to a rear side and the other is moved to a front side by the same distance. Front sides of the pair of yawing driving links 524 are connected to the first joint 720.

Consequently, through the first power transmission part 520, the first joint 720 is rotated by a specific angle about one point on a front side of the joint connecting part 710. In this configuration, when the uterine manipulator 1 is used, the tip 800 exerts a strong torque due to the power transmitted from the spaced housing 500.

Figure 6:
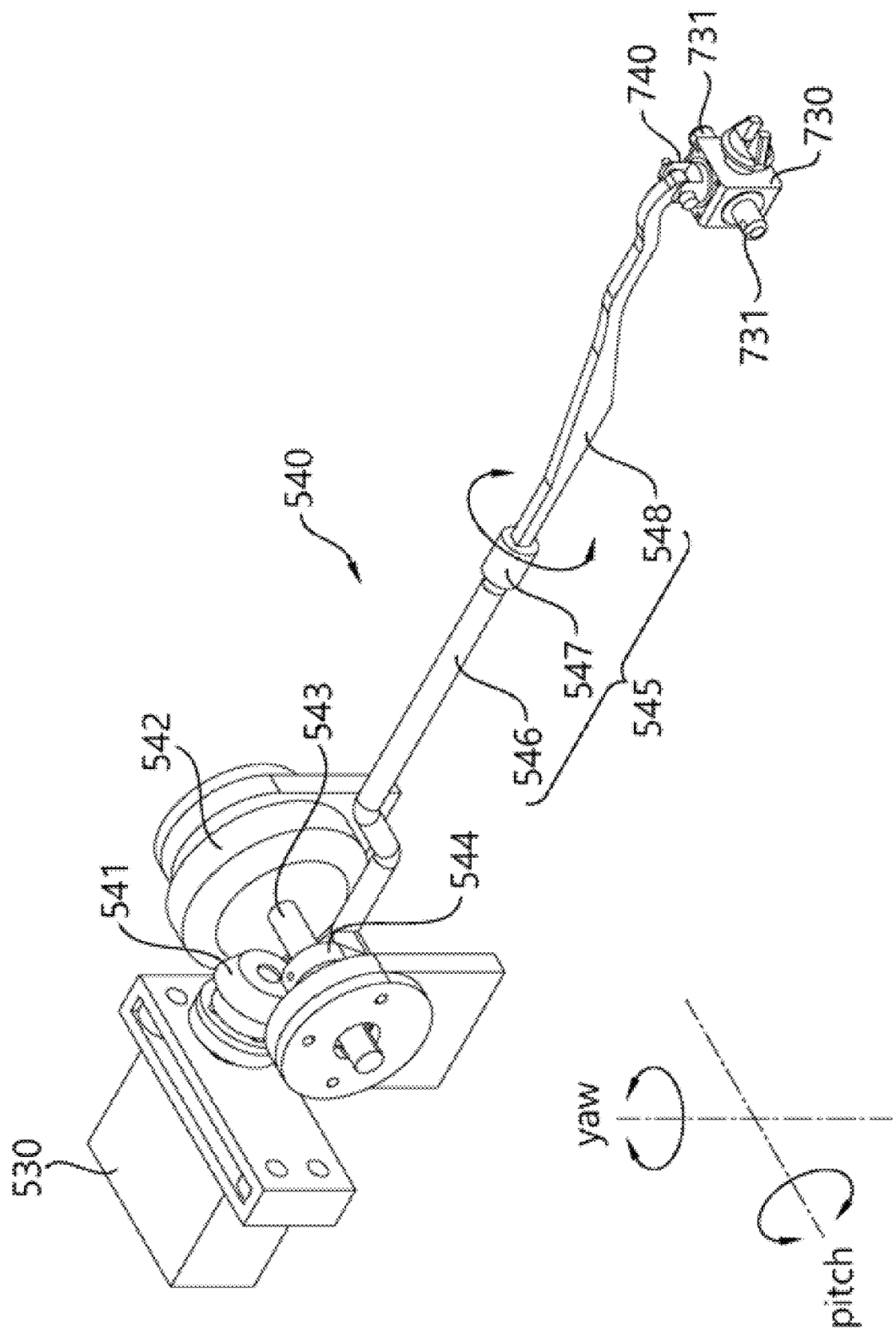
FIG. 6 is an exploded perspective view of a second power transmission part.

FIG. 6 is an exploded perspective view illustrating the second power transmission part 540.

Referring to FIG. 6, the second power transmission part 540 is configured to receive the power from the pitching driving part 530 and adjust an angle of the second joint 730. Similarly to the first power transmission part 520, the second power transmission part also may be implemented as a power transmission mechanism that may convert a rotational force to a motion in a straight direction and then may transmit a rotational force again.

The second power transmission part 540 may include a first pitching bevel gear 541, a second pitching bevel gear 542, and a pitching driving link 545.

The first pitching bevel gear 541 is connected to the pitching driving part 530 to be rotated. The second pitching bevel gear 542 may be engaged with the first pitching bevel gear 541, and may be configured to change a rotational direction and a rotation ratio.

A rotation center shaft 543 extends from one side of the second pitching bevel gear 542 to be connected to the housing 500 to be rotatable. The rotation center shaft 543 is provided with a pitching cam 544, and the pitching cam is connected to a rear side of the pitching driving link 545 to linearly move the pitching driving link 545 in the forward/rearward direction.

As described above, one side of the pitching driving link 545 may be connected to the pitching cam 544, and an opposite side thereof may be connected to one side of the second joint 730 disposed on a front side of the extension part 600. Then, the opposite side of the pitching driving link 545 may be connected to the sub joint 740, and may be connected to the sub joint 740 to be rotatable in a direction, in which pitching thereof is allowed.

The pitching driving link 545 may include a rotary joint 547 that is moved in the forward/rearward direction to remove distortion caused by pitching of the first joint 720 and the second joint 730 when the second joint 730 is rotated. The pitching driving link 545 may be classified into the first pitching driving link 545 on a rear side with respect to the rotary joint 547 and a second pitching driving link 548 on a front side. The first pitching driving link 545 and the second pitching driving link 548 may have a shape that is curved at a specific angle to pass through a hollow of the extension part 600 to transmit power. However, the curved part may be variously deformed according to a connection point, a size of the bevel gear, and a distance from the rotation center.

Consequently, pitching and yawing angles may be complexly adjusted to adjust the angle of the tip 800. Meanwhile, the tip 800 may be connected to a connection part for the tip 800 of the second joint 730.

Hereinafter, an operation of the uterine manipulator 1 according to the inventive concept will be described in detail with reference to FIGS. 7A to 9.

Figure 7A:
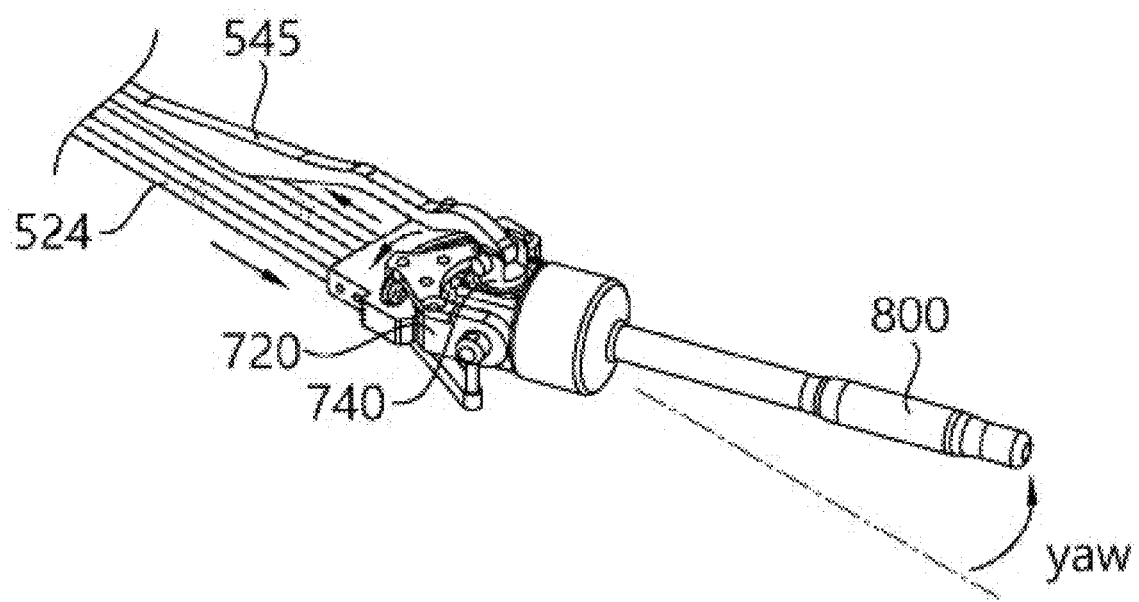
FIG. 7A and FIG. 7B are a view illustrating an operation state of a tip.
Figure 7B:
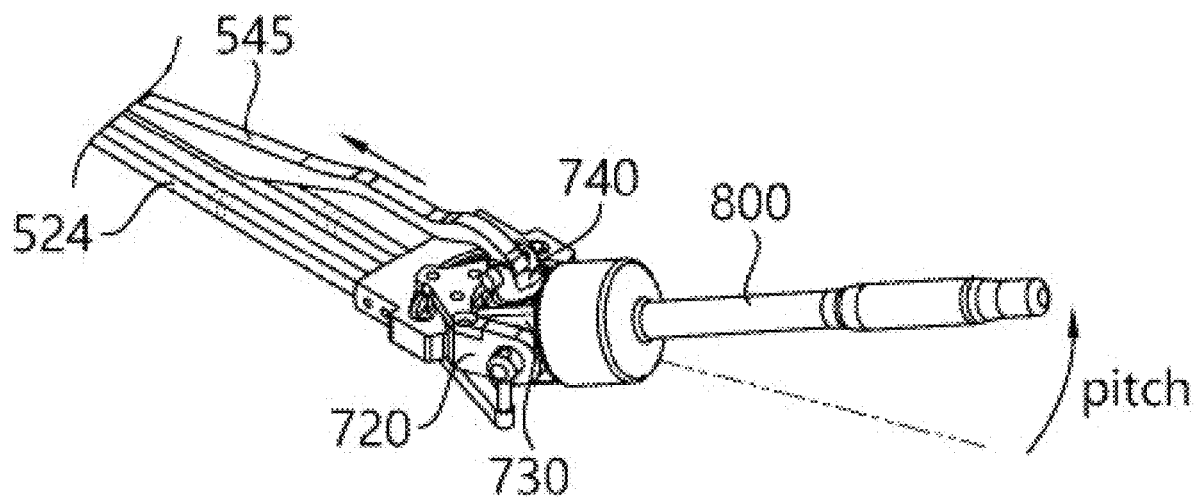

FIG. 7A and FIG. 7B are a view illustrating an operation state of the tip 800. For convenience of description, the drawing illustrates a state, in which the extension part 600 and the colpotomizing cup 810 are removed.

Referring to FIG. 7A, a state, in which the yawing driving link 524 is moved by the yawing driving part 510 and the yawing angle is adjusted while a location of the sub joint 740 is fixed according to the remote center motion mechanism, is illustrated.

Furthermore, referring to FIG. 7B, a state, in which the pitching driving link 545 is moved by the pitching driving part 530 such that pitching is adjusted after the yawing angle is adjusted in FIG. 7A, is illustrated.

Meanwhile, although not illustrated, the yawing angle and the pitching angle may be freely adjusted according to an input by the user, and the angles with respect to the rotational direction may be adjusted freely and independently according to the input by the user. Then, it is preferable that an operation range is limited to a specific range to prevent damage to the human body.

Figure 8:
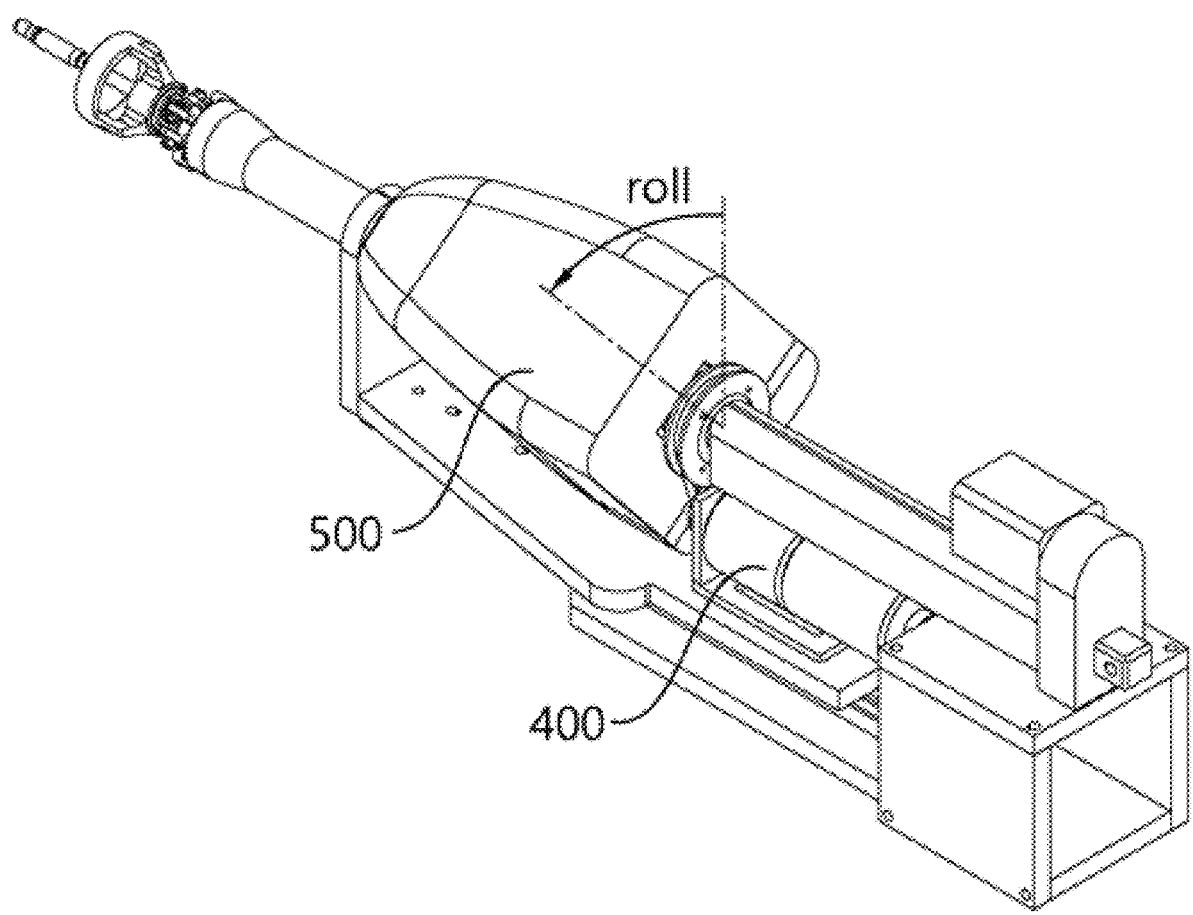
FIG. 8 is a view illustrating an operation state of a rolling driving part.

FIG. 8 is a view illustrating an operation state of the rolling driving part 400.

Referring to FIG. 8, the housing 500 may be rotated as a while when the rolling driving part 400 is operated according to an input by the user. Through rolling of the housing 500, the extension part 600 and the tip 800 also are rotated in a rolling direction with respect to the rotational center axis in the forward/rearward direction. Meanwhile, when the tip 800 is rotated in a rolling direction in a state, in which the yawing and pitching angles are adjusted, it may be rolled while the pitching and yawing angles are maintained. The operation may be performed when a posture of the uterus is changed in the leftward/rightward direction while another organ is minimally influenced during a laparoscopic surgery.

Figure 9:
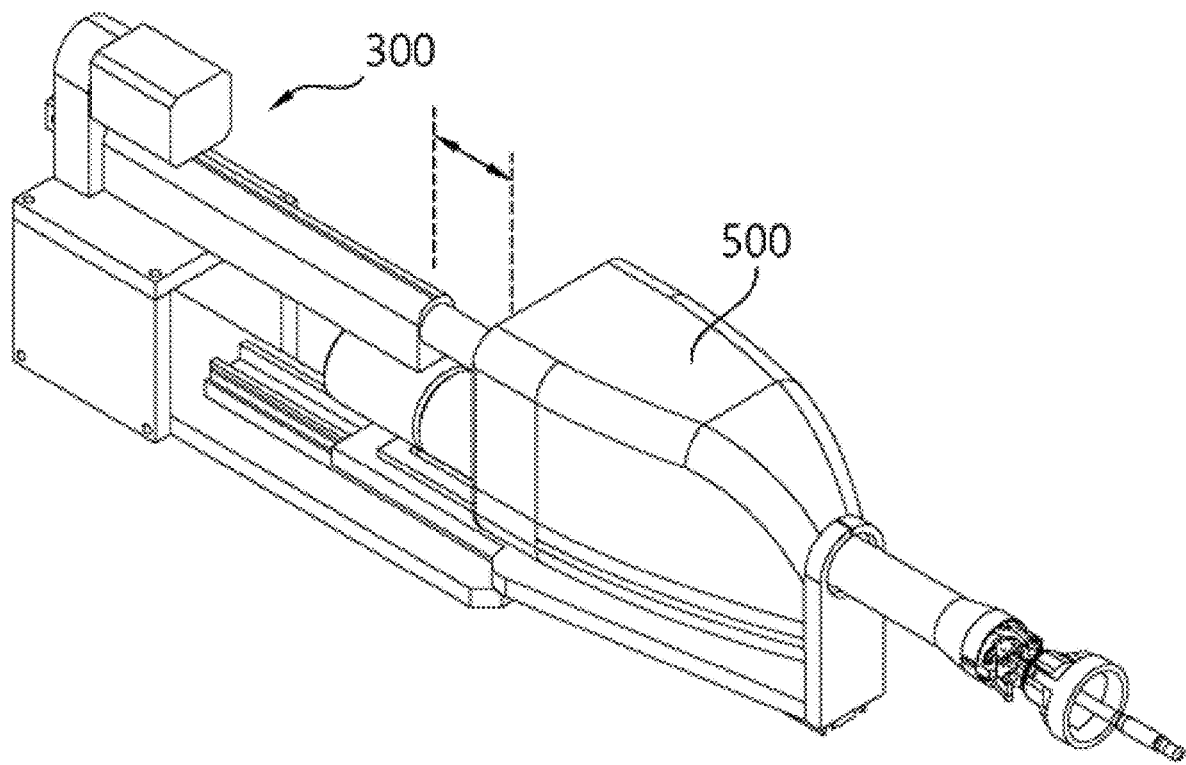
FIG. 9 is a view illustrating an operation state of a linear driving part.

FIG. 9 is a view illustrating an operation state of the linear driving part 300.

Referring to FIG. 9, an operation of the linear driving part 300 moving the housing 500 in the forward/rearward direction on the main frame 100 is illustrated. Through the operation, the tip 800 may be inserted into or extracted from the uterus, and an operation of pushing or pulling the uterus during the laparoscopic surgery may be performed.

Figure 10:
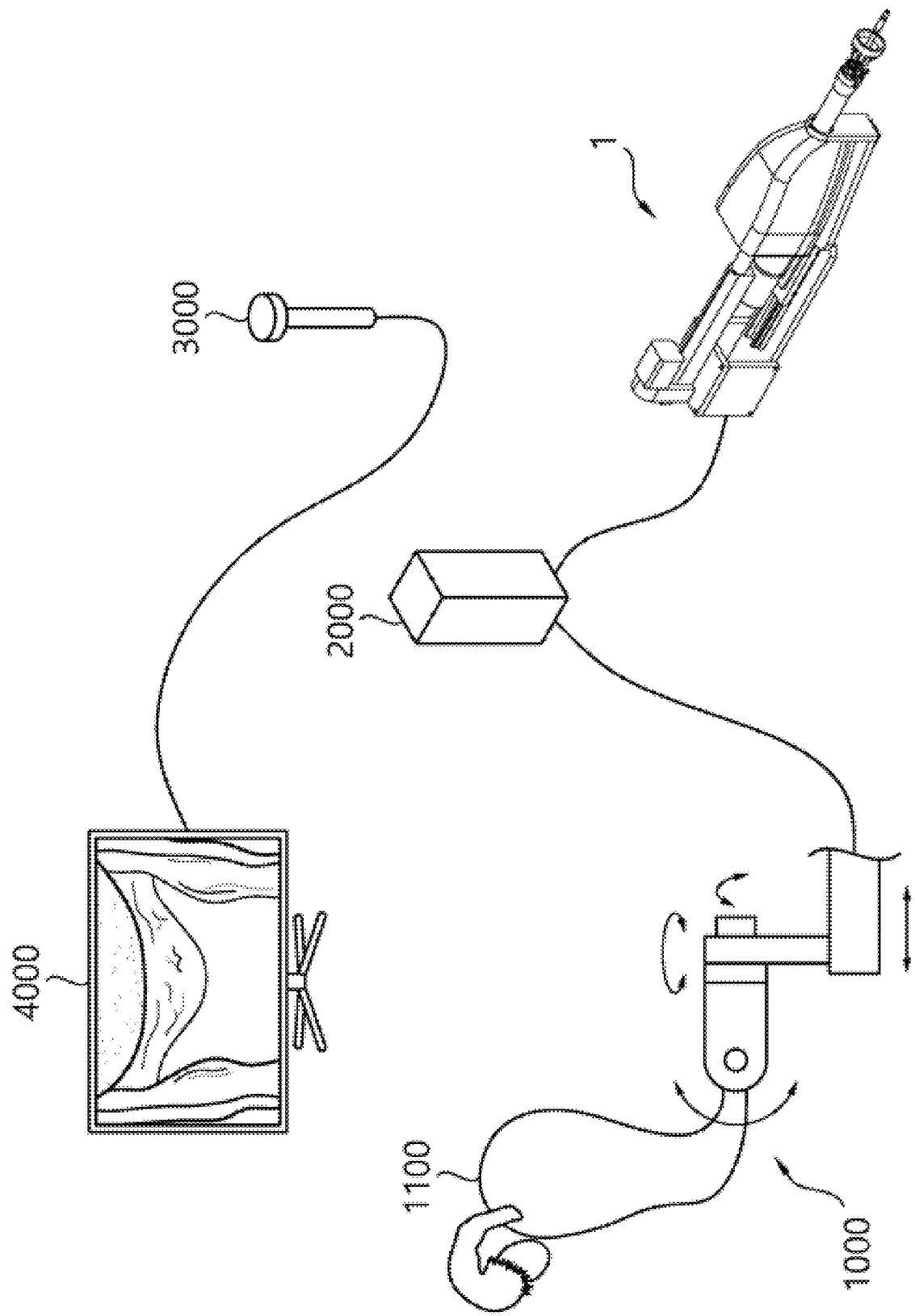
FIG. 10 is a conceptual view of a uterine manipulator system according to anther embodiment of the inventive concept.

FIG. 10 is a conceptual view of a uterine manipulator system according to anther embodiment of the inventive concept.

As illustrated, the uterine manipulator system according to another embodiment of the inventive concept may include a control stick 1000, a central controller 2000, a laparoscope 3000, a display part 4000, and the uterine manipulator 1.

The control stick 1000 may be configured to receive an input for manipulating the uterine manipulator 1 from a medical staff. The control stick 1000 may be configured to allow a 3-axis rotation and a one-axis linear movement, similarly to a degree of freedom of the uterine manipulator 1. A grip part 1100 of the control stick 1000, which is gripped by the medical staff, may be configured to imitate a shape of the uterus. The control stick 1000 may maximize an intuitiveness when an angle, at which the laparoscope 3000 inserted into an abdominal cavity views the uterus, and an angle, at which the medical staff views the grip part, are similar. Accordingly, when the medical staff manipulates the uterine manipulator 1 while identifying an image of the display part 4000 by using the laparoscope 3000, he or she feels as if a posture and a location of the uterus were actually adjusted.

The central controller 2000 generates a control input for receiving an input from the control stick 1000 and controlling the uterine manipulator 1. That is, the control stick 1000 functions as a master device, and controls the uterine manipulator 1 such that the uterine manipulator 1 functions as a slave device. However, a widely used configuration may be applied as a configuration of the controller, and thus a detailed description thereof will be omitted.

Meanwhile, the laparoscope 3000 is connected to an image processing part (not illustrated), and is configured to finally display an obtained image on the display part 4000. A widely used configuration may be used as the laparoscope system, and thus a detailed description thereof will be omitted.

Meanwhile, then, the uterine manipulator may be the uterine manipulator according to the embodiment that has been described with reference to FIGS. 1 to 9.

Figure 11:
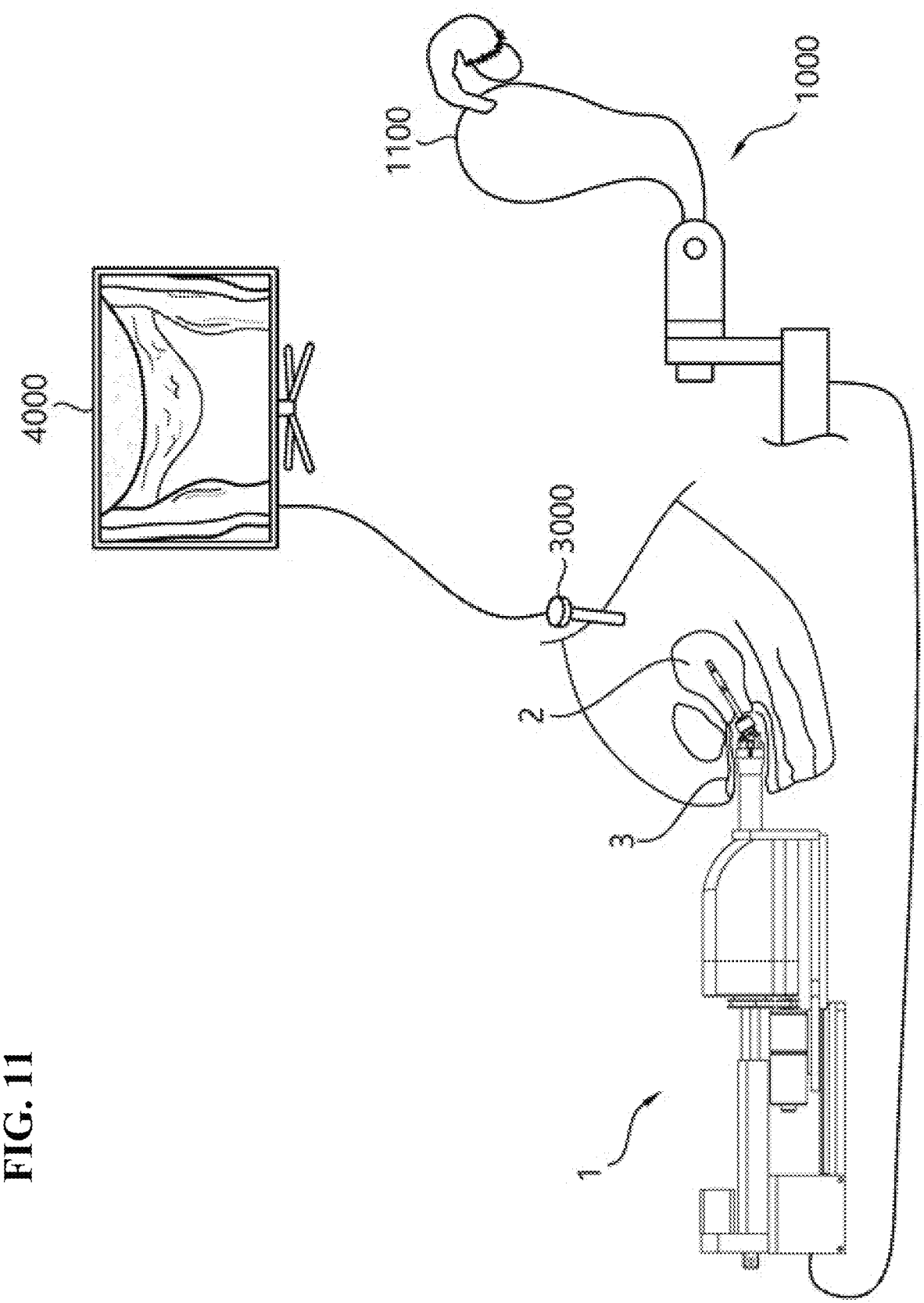
FIGS. 11 to 13 are views of use states of a uterine manipulator system according to another embodiment of the inventive concept.
Figure 12:
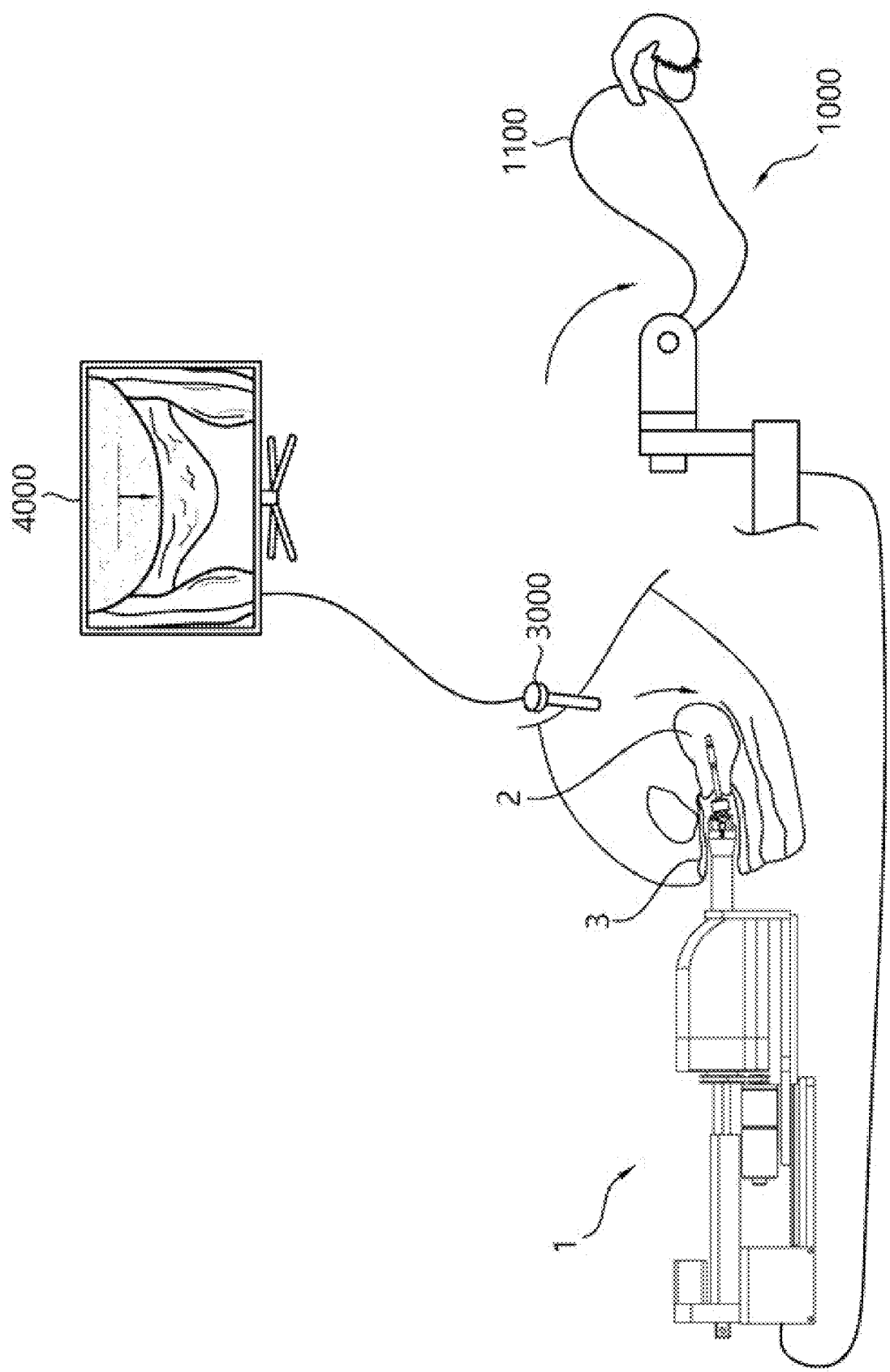
Figure 13:
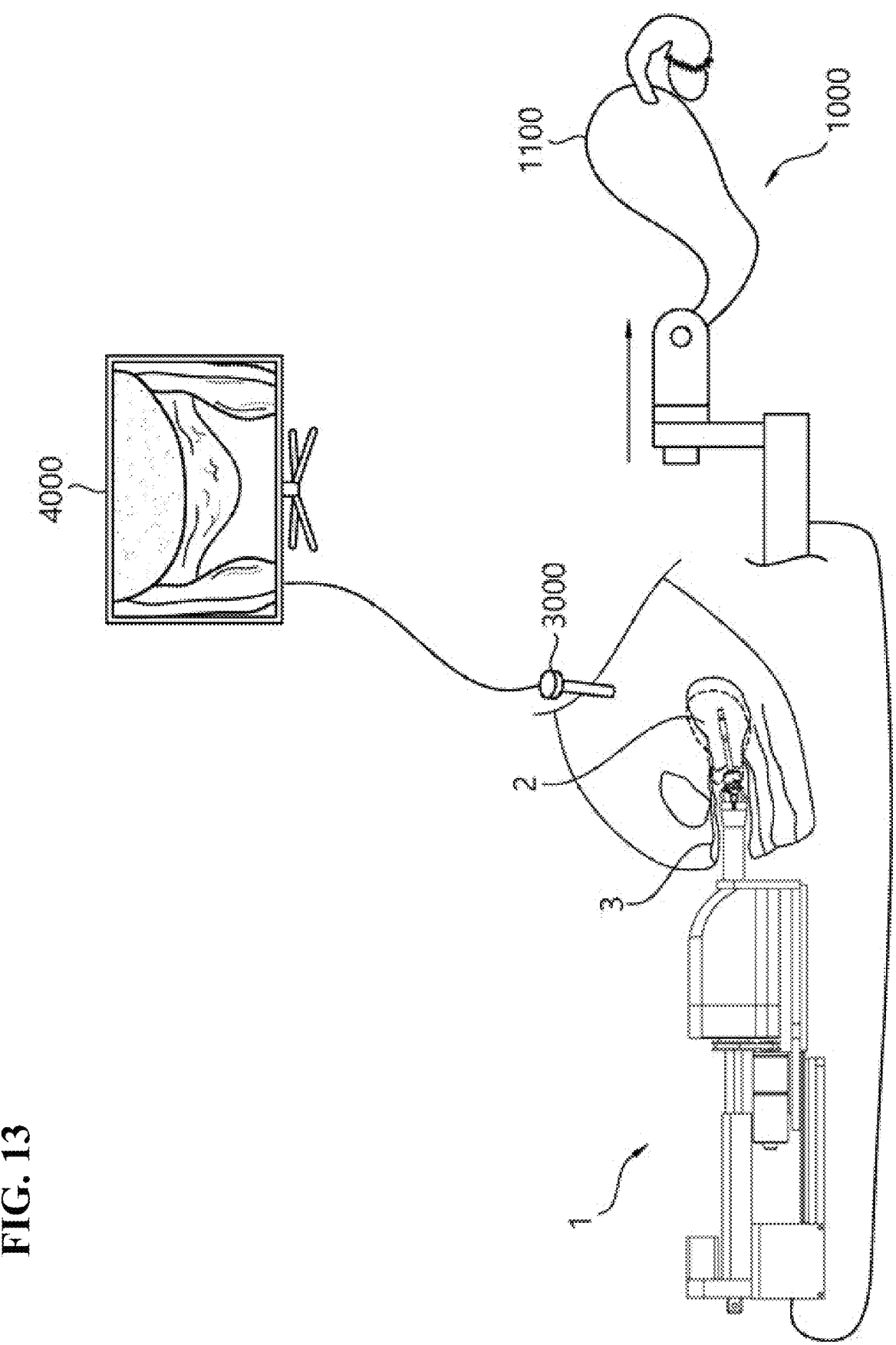

FIGS. 11 to 13 are views of use states of a uterine manipulator system according to another embodiment of the inventive concept. In the following drawings, a use state view that is viewed from a lateral side will be described by using an example for convenience of description. Furthermore, for convenience of description, illustration of the colpotomizing cup will be omitted. Accordingly, an operation thereof is not limited to the drawings, and an operation in a yawing direction, which is not illustrated in the drawings, is independently possible.

Referring to FIG. 11, the tip of the uterine manipulator according to the inventive concept is inserted into a cavity of a uterus 2, and the posture and the location of the uterus may be adjusted at a location, at which a front side of the extension part is inserted into a virginal canal 3. Then, an angle and a location of the uterine manipulator 1 may be adjusted by a medical staff manipulating the control stick 1000.

Referring to FIG. 12, as the user gives an input for lowering the uterus to the control stick 1000, a pitching angle of the tip of the uterine manipulator 1 may be adjusted. Then, when the medical staff adjusts a pitching angle in the clockwise direction while gripping the grip part 1100 on FIG. 12, the posture of the uterus 2 may be finally adjusted to the back in the abdominal cavity. Then, the medical staff may identify a state, in which the uterus is adjusted to a lower side in the abdominal cavity, through the display part 4000.

Referring to FIG. 13, an operation of the uterine manipulator 1 and a finally adjusted location of the uterus 2 when the medical staff pushes the control stick 1000 in to a front side may be identified.

When the medical staff pulls the control stick 1000 (the control stick 1000 is moved to a left side in FIG. 13), the uterine manipulator 1 is moved in a direction, in which the uterus further proceeds into the abdominal cavity (to a right side in FIG. 13). That is, as an input for causing the grip part 1100 of the control stick to become closer to the medical staff, the posture of the uterus 2 is actually adjusted to a direction, in which the uterus 2 becomes closer to the laparoscope 3000.

Meanwhile, the example of the uterus described in FIGS. 11 to 13 illustrates a state, in which the uterus is changed by an external force according to characteristics of the organ. Then, with regard to the operation angle of the uterine manipulator 1, the operation angle of the tip 800 may be limited to a specific angle to prevent damage to the uterus or adjacent tissues, for example, prevent them from being pushed or torn, the rolling angle may be limited, and a linear movement distance of the uterine manipulator 1 may be limited.

As described above, according to the uterine manipulator according to the inventive concept, the tip may be rotated in two directions of yawing and pitching directions, and the uterus may be supported in various postures and the location and the posture thereof may be changed through forward/rearward movement and rolling of the extension part and the housing.

The uterine manipulator according to the inventive concept may allow a motion of a total of four degrees of freedom with a rotation of a 3 degree of freedom of rolling, pitching, and yawing, and a linear movement of one degree of freedom in a forward/rearward direction, and because the tip may be adjusted in a narrow space, surgical preciseness may be enhanced. Furthermore, because the surgical operator may manipulate the uterus through a direct input, a surgical time may be shortened.

What is claimed is:

1. A uterine manipulator comprising:
   a housing disposed on an outside of a human body during use thereof;
   an extension part provided on a front side of the housing, extending in a forward/rearward direction, and at least a portion of which is configured to be inserted into a vaginal canal;
   a tip configured to be inserted into a uterus, and connected to a front end of the extension part to pitch and yaw,
   wherein the tip is configured to receive power from the housing such that an angle thereof is adjusted;
   a joint assembly connecting power transmission elements of the housing with the tip,
   wherein the joint assembly includes:
   a joint connecting part provided on an opposite side of the extension part, and having an arc slot, a center of which is one point formed on an inner side toward a front side thereof;
   a first joint including a first follower inserted into the arc slot, and having a pair of holes on left and right sides thereof; and
   a second joint including a pair of connection pins extending in opposite directions to pass through the pair of holes of the first joint, and configured to be rotatable relative to the first joint.

2. The uterine manipulator of claim 1, further comprising:
   a sub frame configured to support the housing such that the housing is rotatable about a central axis in the forward/rearward direction; and
   a rolling driving part provided in the sub frame, connected to one side of the housing, and configured to rotate the housing about the central axis in the forward/rearward direction.

3. The uterine manipulator of claim 1, wherein the power transmission elements of the housing comprise:
   a yawing driving part provided on an inside of the housing, and configured to transmit driving power to yaw the tip;
   a pitching driving part provided on the inside of the housing, and configured to pitch the tip;
   a first power transmission part, at least a portion of which disposed on an inside of the extension part such that the first power transmission part receives power from the yawing driving part to yaw the tip; and
   a second power transmission part, at least a portion of which is disposed on the inside of the extension part such that the second power transmission part receives power from the pitching driving part to pitch the tip.

4. The uterine manipulator of claim 3,
   wherein the joint assembly is configured such that a rotational central axis of yawing of the tip and a rotational central axis of pitching of the tip cross each other.

5. The uterine manipulator of claim 4, wherein the joint assembly is configured to yaw the tip according to a remote center motion mechanism.

6. The uterine manipulator of claim 5, wherein the first power transmission part includes a second follower and a third follower, sides of which are connected to the yawing driving part and opposite sides of which are connected to the pair of connection pins.

7. The uterine manipulator of claim 6, wherein one side of the second power transmission part is connected to the pitching driving part, and an opposite side thereof is connected one of the second joint.

8. The uterine manipulator of claim 7, wherein the first joint is operated by the remote center motion mechanism according to locations of the first follower, the second follower, and the third follower.

9. The uterine manipulator of claim 8, wherein the first power transmission part includes:
   a bevel gear configured to receive the power from the yawing driving part; and
   a pair of pitching driving links, sides of which are connected to two points radially spaced apart from a rotational central axis of the bevel gear by a specific distance to be rotatable, and including the first follower and the second follower at opposite ends thereof.

10. The uterine manipulator of claim 8, wherein the second power transmission part includes:
    a bevel gear configured to receive the power from the pitching driving part; and
    a pitching driving link configured to receive the power from the bevel gear on one side thereof, configured to be moved in the forward/rearward direction according to rotation of the bevel gear, and an opposite side of which is connected to one side of the second joint.

11. The uterine manipulator of claim 10, wherein the pitching driving link includes a rotary joint that allows one side of the pitching driving link and an opposite side of the pitching driving link to be rotated with respect to each other.

12. The uterine manipulator of claim 11, further comprising:
    a main frame; and
    a sub frame,
    wherein the sub frame is configured to be linearly moved on the main frame in the forward/rearward direction.

13. The uterine manipulator of claim 12, further comprising:
    a linear driving part provided on one side of the main frame, one side of which is connected to one side of the housing, and configured to move the housing and the sub frame in the forward/rearward direction.

14. The uterine manipulator of claim 1, further comprising:
    a control stick configured to receive an input from a user,
    wherein the control stick includes a grip part having a shape that imitates a uterus viewed in an abdominal cavity, and
    wherein the uterine manipulator is driven according to an input of the control stick.

* * * * *